US012781034B2

(12) United States Patent
Cho et al.

(10) Patent No.: US 12,781,034 B2
(45) Date of Patent: Nov. 3, 2026

(54) SEMICONDUCTIVE COMPOSITION AND POWER CABLE HAVING SEMICONDUCTIVE LAYER FORMED THEREFROM

(71) Applicant: LS CABLE & SYSTEM LTD., Anyang-si (KR)

(72) Inventors: Young Eun Cho, Yangcheon-gu (KR); Gi Joon Nam, Seocho-gu (KR); Sue Jin Son, Gunpo-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 131 days.

(21) Appl. No.: 18/571,106

(22) PCT Filed: Feb. 10, 2022

(86) PCT No.: PCT/KR2022/002049
§ 371 (c)(1),
(2) Date: Dec. 15, 2023

(87) PCT Pub. No.: WO2022/265181
PCT Pub. Date: Dec. 22, 2022

(65) Prior Publication Data

US 2024/0279449 A1 Aug. 22, 2024

(30) Foreign Application Priority Data

Jun. 16, 2021 (KR) ........................ 10-2021-0077824

(51) Int. Cl.
*C08L 23/12* (2006.01)
*C08K 3/04* (2006.01)
(Continued)

(52) U.S. Cl.
CPC ................ *C08L 23/12* (2013.01); *C08K 3/04* (2013.01); *C08L 23/00* (2013.01); *H01B 9/027* (2013.01);
(Continued)

(58) Field of Classification Search
CPC ...................................................... H01B 9/027
(Continued)

(56) References Cited

U.S. PATENT DOCUMENTS

2010/0025073 A1 * 2/2010 Fagrell ..................... C09D 5/20 264/105
2021/0304921 A1 * 9/2021 Horton ................... H01B 7/285
(Continued)

FOREIGN PATENT DOCUMENTS

JP 10-144141 * 5/1998
JP 2000268631 A 9/2000
(Continued)

OTHER PUBLICATIONS

Yao Zhou et al., Evaluation of Popylpropylene/Polyolefin Elastomer Blends for Potential Recyclable HVDC Cable Insulation Applications, IEEE Transactions on Dielectrics and Electrical Insulation, vol. 22, No. 2, Apr. 2015.*
(Continued)

*Primary Examiner* — Chau N Nguyen
(74) *Attorney, Agent, or Firm* — K&L Gates LLP

(57) ABSTRACT

A semiconductive composition and a power cable having a semiconductive layer formed therefrom may be provided. More particularly, a semiconductive composition may be provided that is environmentally friendly, excellent in mechanical properties, heat resistance, etc., and excellent in extrudability having a trade-off relationship therewith and a power cable having a semiconductive layer formed therefrom.

5 Claims, 3 Drawing Sheets

(51) Int. Cl.
*C08L 23/00* (2006.01)
*H01B 9/02* (2006.01)

(52) U.S. Cl.
CPC .. *C08K 2201/001* (2013.01); *C08L 2203/202* (2013.01)

(58) Field of Classification Search
USPC ...................................... 174/102 SC, 120 SC
See application file for complete search history.

(56) References Cited

U.S. PATENT DOCUMENTS

| | | | | |
|---|---|---|---|---|
| 2022/0340741 | A1* | 10/2022 | Nilsson | C08L 91/06 |
| 2023/0033608 | A1* | 2/2023 | Lee | C08K 5/14 |
| 2024/0002647 | A1* | 1/2024 | Gkourmpis | C08L 23/142 |
| 2024/0153667 | A1* | 5/2024 | Thorn | H01B 3/447 |

FOREIGN PATENT DOCUMENTS

| | | | |
|---|---|---|---|
| KR | 1020000076164 | A | 12/2000 |
| KR | 1020160106581 | A | 9/2016 |
| KR | 20190003385 | A | 1/2019 |
| KR | 1020190015116 | A | 2/2019 |
| LR | 1020170007903 | A | 1/2017 |

OTHER PUBLICATIONS

International Search Report for related International Application No. PCT/KR2022/002049; action dated Dec. 22, 2022; (2 pages).
Written Opinion for related International Application No. PCT/KR2022/002049; action dated Dec. 22, 2022; (3 pages).
Office Action for related Korean Application No. 10-2021-0077824; action dated Nov. 25, 2025; (4 pages).

* cited by examiner

SEMICONDUCTIVE COMPOSITION AND POWER CABLE HAVING SEMICONDUCTIVE LAYER FORMED THEREFROM

CROSS-REFERENCE TO RELATED APPLICATIONS

The present application is a National Stage of International Application No. PCT/KR2022/002049 filed on Feb. 10, 2022, which claims the benefit of Korean Patent Application No. 10-2021-0077824, filed on Jun. 16, 2021, filed with the Korean Intellectual Property Office, the entire contents of each hereby incorporated by reference.

FIELD

The present disclosure relates to a semiconductive composition and a power cable having a semiconductive layer formed therefrom. More particularly, the present disclosure relates to a semiconductive composition that is environmentally friendly, excellent in mechanical properties, heat resistance, etc., and excellent in extrudability having a trade-off relationship therewith and a power cable having a semiconductive layer formed therefrom.

BACKGROUND

A general power cable includes a conductor and an insulating layer configured to enclose the conductor, and may further include an inner semiconductive layer disposed between the conductor and the insulating layer, an outer semiconductive layer configured to enclose the insulating layer, and a sheath layer configured to enclose the outer semiconductive layer. In particular, the inner semiconductive layer improves the interfacial roughness between the conductor and the insulating layer at the time of manufacture of a cable, thereby inhibiting the formation of an air layer therebetween, and forms the gradient of insulation resistance, thereby alleviating localized electric field concentration in the insulating layer.

In addition, the outer semiconductive layer shields the cable and ensures that an even electric field is applied to the insulating layer. That is, the inner semiconductive layer and the outer semiconductive layer (hereinafter referred to as "semiconductive layer") perform very important functions in terms of enhancing the electrical and mechanical properties of the cable and extending the lifespan of the cable.

A conventional semiconductive composition, from which a semiconductive layer is formed, generally uses a crosslinked polyethylene-based polymer, such as polyethylene, ethylene-propylene rubber (EPR), or ethylene-propylene-diene monomer (EPDM), as a base resin. The reason for this is that the conventional crosslinked resin maintains good flexibility satisfactory electrical and mechanical strength even at high temperatures.

Crosslinked polyethylene (XLPE) used as the base resin constituting the semiconductive composition is in a crosslinked form. When a cable including a semiconductive layer made of a resin, such as crosslinked polyethylene, reaches end of life, the resin constituting the semiconductive layer cannot be recycled and can only be disposed of by incineration, which is not environmentally friendly.

In addition, when polyvinyl chloride (PVC) is used as the material for the sheath layer, it is difficult to separate polyvinyl chloride from crosslinked polyethylene (XLPE) constituting the semiconductive layer, and therefore toxic chlorinated substances are generated when incinerated, which is not environmentally friendly.

Meanwhile, non-crosslinked high-density polyethylene (HDPE) or low-density polyethylene (LDPE) is environmentally friendly in that, when a cable including a semiconductive layer manufactured therefrom reaches end of life, a resin constituting the semiconductive layer can be recycled, but has the disadvantage of having lower heat resistance than crosslinked polyethylene (XLPE), whereby use thereof is very limited due to low operating temperature thereof.

Therefore, it is possible to consider using a polypropylene resin, which has a melting point (Tm) of 160° C. or higher, has excellent heat resistance without crosslinking, and is environmentally friendly, as a base resin. However, the extrudability of the polypropylene resin may be greatly reduced due to high melting point and low melting index (MI) thereof.

Furthermore, in the semiconductive composition, a conductive additive, such as carbon black, is mixed in the base resin in order to realize the semiconductive properties thereof, and the extrudability of the semiconductive composition may be significantly reduced by the conductive additive.

Therefore, there is an urgent need for a semiconductive composition that is environmentally friendly, excellent in mechanical properties, heat resistance, etc., and excellent in extrudability having a trade-off relationship therewith and a power cable having a semiconductive layer formed therefrom.

SUMMARY

It is an object of the present disclosure to provide an environmentally-friendly semiconductive composition and a power cable having a semiconductive layer formed therefrom.

It is another object of the present disclosure to provide a semiconductive composition that is excellent in mechanical properties, heat resistance, etc. and excellent in extrudability having a trade-off relationship therewith and a power cable having a semiconductive layer formed therefrom.

In accordance with the present disclosure, the above and other objects can be accomplished by the provision of a semiconductive composition comprising: a polypropylene resin and a polyolefin elastomer as a base resin; and a conductive additive, wherein crystallinity of the semiconductive composition defined by Equation 1 below is 20 to 70%.

$$\text{Crystallinity (\%)} = \text{semiconducting integral value}/\text{insulating integral value} \times 100 \qquad \text{[Equation 1]}$$

In Equation 1 above, the semiconducting integral value means a value of integral of an endothermic peak in a temperature section of 100 to 170° C. of a first heating curve measured under conditions of a temperature range of 30 to 200° C. and a temperature increase rate of 10° C./min using a differential scanning calorimetry (DSC) for a specimen formed from the semiconductive composition, and the insulating integral value means a value of integral of an endothermic peak in a temperature section of 100 to 170° C. of a first heating curve measured under conditions of a temperature range of 30 to 200° C. and a temperature increase rate of 10° C./min using the differential scanning calorimetry (DSC) for a specimen formed from an insulating composition comprising only a non-crosslinked polypropylene resin as a base resin.

Further, provided is the semiconductive composition, wherein the content of the non-crosslinked polypropylene resin and the content of the polyolefin elastomer are each independently 25 to 75 parts by weight based on 100 parts by weight of the base resin.

Further, provided is the semiconductive composition, wherein the conductive additive comprises carbon black.

Further, provided is the semiconductive composition, wherein the content of the carbon black is 30 to 60 parts by weight based on 100 parts by weight of the base resin.

Further, provided is the semiconductive composition, comprising 0.5 to 3 parts by weight of an antioxidant based on 100 parts by weight of the base resin.

Further, provided is a power cable comprising: at least one conductor; an inner semiconductive layer configured to enclose the conductor; an insulating layer configured to enclose the inner layer; semiconductive an outer semiconductive layer configured to enclose the insulating layer; and a sheath layer configured to enclose the outer semiconductive layer, wherein at least one of the inner semiconductive layer and the outer semiconductive layer is formed from the semiconductive composition.

Further, provided is the power cable, wherein the insulating layer is formed from an insulating composition comprising a non-crosslinked polypropylene resin as a base resin.

A semiconductive composition according to the present disclosure exhibits excellent eco-friendliness by adopting a non-crosslinked polypropylene resin as a base resin.

In addition, the semiconductive composition according to the present disclosure exhibits excellent effects in that mechanical properties, heat resistance, etc. are excellent and extrudability, which has a trade-off relationship therewith, is simultaneously improved by controlling the crystallinity thereof.

DETAILED DESCRIPTION

Figure 1:
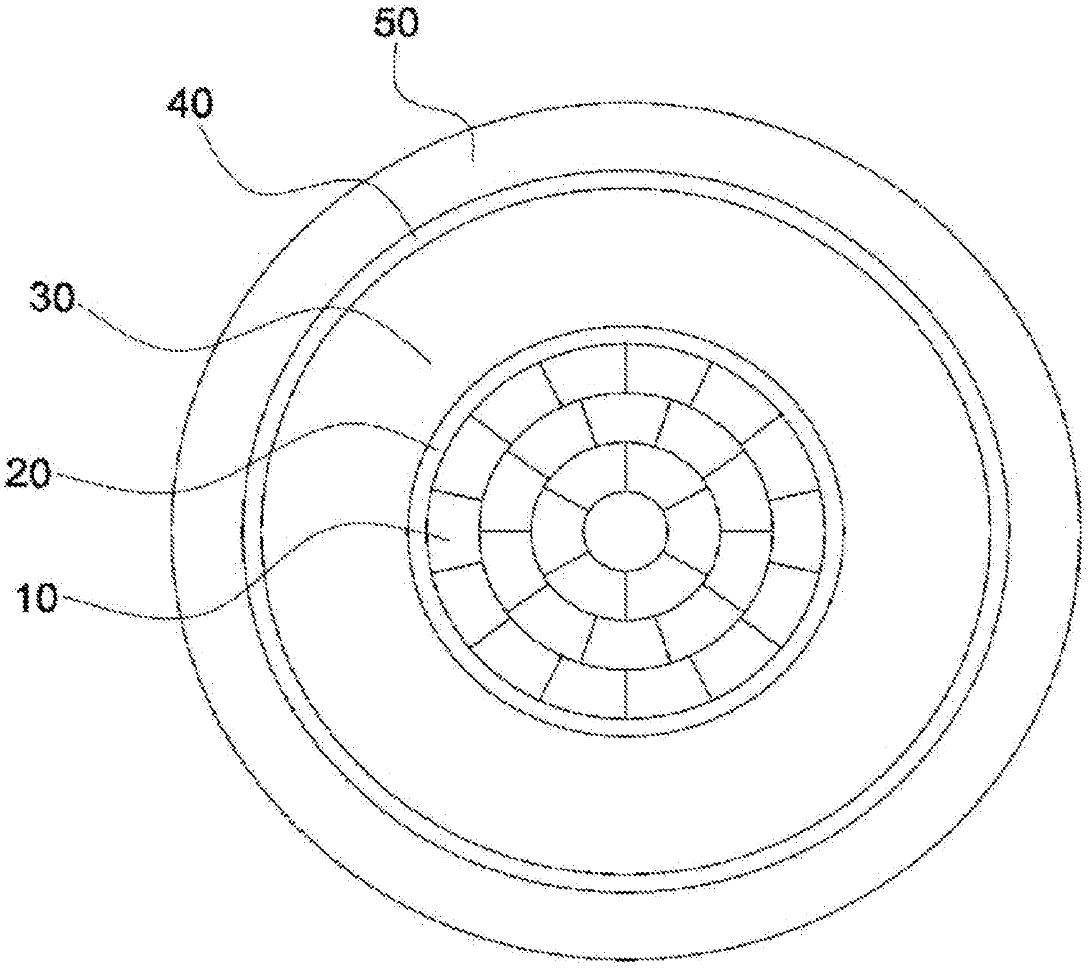
FIG. 1 schematically shows a cross-sectional structure of an embodiment of a power cable according to the present disclosure.

Hereinafter, preferred embodiments of the present disclosure will be described in detail. However, the present disclosure is not limited to the embodiments described herein, and may be embodied in various different forms. Rather, these embodiments are provided such that the present disclosure will be thorough and complete, and will fully convey the scope of the present disclosure to those skilled in the art. The same reference numbers denote the same elements throughout the specification.

The present disclosure relates to a semiconductive composition capable of forming a semiconductive layer of a power cable.

The semiconductive composition according to the disclosure may include a non-crosslinked polypropylene resin and a polyolefin elastomer as a base resin, wherein the polypropylene resin may include a propylene homopolymer and/or a propylene copolymer, preferably a propylene homopolymer, and the propylene homopolymer means polypropylene formed by polymerization of at least 99 wt %, preferably 99.5 wt %, of propylene based on the total weight of a monomer.

The propylene copolymer may include a copolymer of propylene with ethylene or an α-olefin of carbon number 4 to 12, for example, a comonomer selected from 1-butene, 1-pentene, 4-methyl-1-pentene, 1-hexene, 1-octene, 1-decene, 1-dodecene, and a combination thereof, preferably with ethylene. The reason for this is that copolymerization of propylene with ethylene results in rigid yet flexible properties.

The non-crosslinked polypropylene resin may have a weight average molecular weight (Mw) of 200,000 to 450,000. Furthermore, the non-crosslinked polypropylene resin may have a melting point (Tm) of 140 to 175° C. (as measured by differential scanning calorimetry (DSC)), a melting enthalpy of 50 to 100 J/g (as measured by DSC), and a flexural strength at room temperature of 30 to 1,000 MPa, preferably 60 to 1,000 MPa (as measured according to ASTM D790).

The non-crosslinked polypropylene resin may be polymerized under a general stereospecific Ziegler-Natta catalyst, a metallocene catalyst, a constrained geometry catalyst, other organometallic or coordination catalysts, preferably under the Ziegler-Natta catalyst or the metallocene catalyst. Here, "metallocene" is a generic term for bis(cyclopentadienyl) metals, which are novel organometallic compounds in which cyclopentadiene and a transition metal are combined in a sandwich structure, and the general formula of the simplest structure is M $(C_5H_5)_2$ (where M is Ti, V, Cr, Fe, Co, Ni, Ru, Zr, Hf, etc.). Since polypropylene polymerized under the metallocene catalyst has a low catalyst residual of about 200 to 700 ppm, degradation of the electrical properties of an insulating composition including polypropylene by the catalyst residual may be inhibited or minimized.

The above non-crosslinked polypropylene resin, despite being non-crosslinked, has a high melting point, which enables the non-crosslinked polypropylene resin to exhibit sufficient heat resistance, whereby it is possible to provide a power cable with an improved continuous use temperature, and also exhibits excellent eco-friendliness, such as being recyclable, due to the non-crosslinked form thereof. On the other hand, a conventional crosslinked resin is not only environmentally unfriendly because the crosslinked resin is difficult to recycle, but premature crosslinking or scorching during formation of the semiconductive layer of the cable may cause long-term extrudability degradation, such as inability to achieve uniform production capacity.

Meanwhile, the polyolefin elastomer may include a copolymer of an ethylene monomer and an α-olefin other than the ethylene monomer, for example, propylene, butene, propene, hexene, heptene, or octene, preferably an ethylene-butene copolymer, and may have a melting flow rate (MFR) (190° C., 2.16 kg) of 1 to 8 g/10 min and a melting point of 40 to 105° ° C.

The inventors of the present application have completed the present disclosure by experimentally confirming that, when the crystallinity defined by Equation 1 below is adjusted to 20 to 70% on the premise that the semiconductive composition according to the present disclosure includes the base resin and a conductive additive described below, the mechanical properties, heat resistance, etc. of the semiconductive layer of the cable formed from the semiconductive composition and the extrudability having a trade-off relationship therewith are simultaneously improved.

$$\text{Crystallinity (\%)} = \text{semiconducting integral value} / \text{insulating integral value} \times 100 \qquad \text{[Equation 1]}$$

In Equation 1 above, the semiconducting integral value means the value of the integral of an endothermic peak in a temperature section of 100 to 170° C. of a first heating curve measured under conditions of a temperature range of 30 to 200° ° C. and a temperature increase rate of 10° C./min using a differential scanning calorimetry (DSC) for a pressed specimen formed from a semiconductive composition including a non-crosslinked polypropylene resin and a polyolefin elastomer as a base resin and further including a conductive additive, and the insulating integral value means the value of the integral of an endothermic peak in a temperature section of 100 to 170° C. of a first heating curve measured under conditions of a temperature range of 30 to 200° C. and a temperature increase rate of 10° C./min using the differential scanning calorimetry (DSC) for a pressed specimen formed from an insulating composition including only a non-crosslinked polypropylene resin as a base resin.

For example, the content of the non-crosslinked polypropylene resin and the content of the polyolefin elastomer may each independently be 25 to 75 parts by weight based on 100 parts by weight of the base resin.

If the content of the non-crosslinked polypropylene resin exceeds 75 parts by weight and thus the content of the polyolefin elastomer is less than 25 parts by weight, the crystallinity of the semiconductive composition may be excessive, resulting in insufficient room temperature elongation among the mechanical properties of the semiconductive composition, and in particular, a significant decrease in extrudability, resulting in a significant decrease in surface roughness of the semiconductive layer formed.

On the other hand, if the content of the polyolefin elastomer exceeds 75 parts by weight and thus the content of the non-crosslinked polypropylene resin is less than 25 parts by weight, the crystallinity of the semiconductive composition may be significantly reduced, resulting in insufficient tensile strength among the mechanical properties of the semiconductive composition, in particular a significant decrease in heat resistance.

Meanwhile, the semiconductive composition may further include 30 to 60 parts by weight of a conductive additive, such as carbon black, and 0.5 to 3 parts by weight of an antioxidant based on 100 parts by weight of the base resin.

If the content of the conductive additive, such as carbon black, is less than 30 parts by weight, the semiconductive composition may not exhibit semiconductive properties due to a sharp increase in resistance. On the other hand, if the content of the conductive additive exceeds 60 parts by weight, screw load may increase during extrusion due to an increase in viscosity of the semiconductive composition, which may further significantly reduce workability and extrudability.

If the content of the antioxidant is less than 0.5 parts by weight, securing long-term heat resistance of the formed semiconductive layer in a high-temperature environment may be difficult. On the other hand, if the content of the antioxidant exceeds 3 parts by weight, a blooming phenomenon in which the antioxidant elutes white onto the surface of the semiconductive layer may occur, resulting in deterioration of semiconductive properties.

Furthermore, the semiconductive composition may further include other additives, such as processing oil, a stabilizer, and an active agent, in addition to the conductive additives and the antioxidant.

Figure 2:
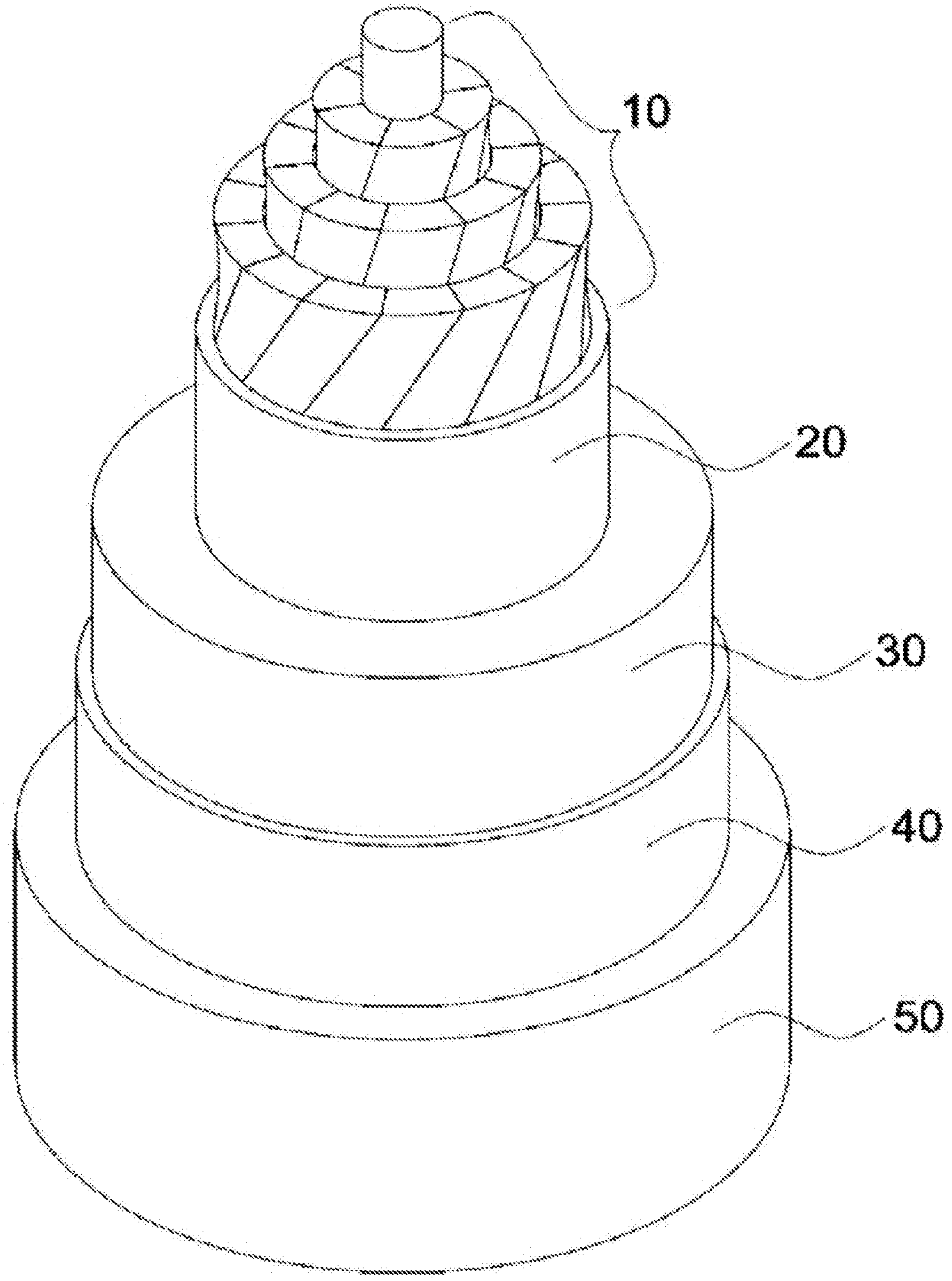
FIG. 2 schematically shows a stepped cross-sectional structure of the power cable shown in FIG. 1.

The present disclosure relates to a power cable having the semiconductive layer formed from the semiconductive composition described above, particularly an inner semiconductive layer, and FIGS. 1 and 2 schematically show the structure of an embodiment of a power cable according to the present disclosure.

As shown in FIGS. 1 and 2, the power cable according to the present disclosure may include a conductor 10 made of a conductive material such as copper or aluminum, an insulating layer 30 made of an insulative polymer, etc., an inner semiconductive layer 20 configured to enclose the conductor 10, to eliminate an air layer between the conductor 10 and the insulating layer 30, and to relieve localized electric field concentration, the inner semiconductive layer being formed from the semiconductive composition according to the present disclosure described above, an outer semiconductive layer 40 configured to shield the cable and to ensure that an even electric field is applied to the insulating layer 30, the outer semiconductive layer being formed from the semiconductive composition according to the present disclosure described above, and a sheath layer 50 configured to protect the cable.

The standards of the conductor 10, the insulation layer 30, the semiconductive layers 20 and 40, and the sheath layer 50 may vary depending on the use, transmission voltage, etc. of the cable.

The conductor 10 may be made of a stranded wire constituted by a plurality of wires in terms of improving cold resistance, flexibility, bendability, laying ability, workability, etc. of the power cable, and in particular may include a plurality of conductor layers formed by arranging a plurality of wires in a circumferential direction of the conductor 10.

The insulating layer 30 may be formed from an insulating composition including the non-crosslinkable polypropylene resin, which is one of the base resins of the semiconductive composition described above, as a base resin. Consequently, each of the insulating composition and the semi-conductive composition includes the non-crosslinkable polypropylene resin as the base resin. When the insulating layer 30 and the semiconductive layers 20 and 40 are extruded, therefore, extrusion workability may be improved, such as easy control of the extrusion process, and interlayer adhesion may be improved.

EXAMPLES

1. Manufacturing Example

Figure 3:
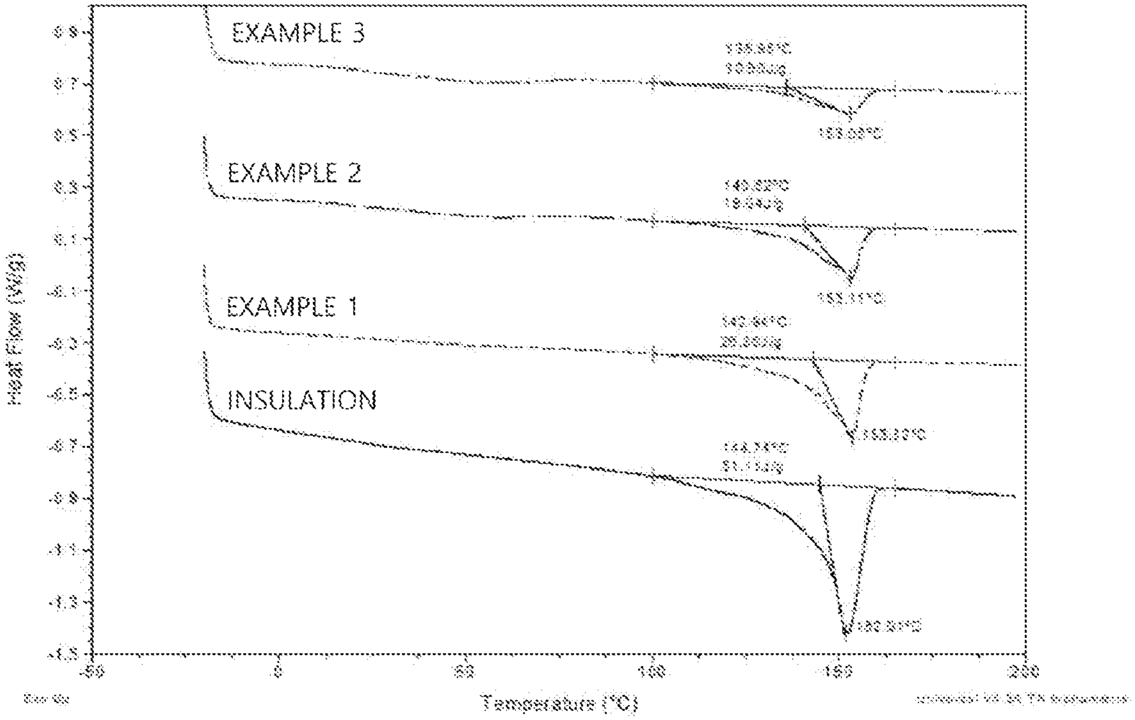
FIG. 3 is a graph showing first heating curves of semiconductive press specimens derived from examples using a differential scanning calorimetry (DSC).

Semiconductive compositions were prepared using a kneader mixer with components and contents listed in Table 1 below, press specimens were manufactured, and crystallinity was measured by calculating the peak integral value from a first heating curve obtained by a DSC, as shown in FIG. 3. In Table 1 below, the unit of the contents is parts by weight.

TABLE 1

| | Example 1 | Example 2 | Example 3 | Comparative Example 1 | Comparative Example 2 |
|---|---|---|---|---|---|
| Resin 1 | 75 | 50 | 25 | 80 | 20 |
| Resin 2 | 25 | 50 | 75 | 20 | 80 |
| Additive 1 | 55 | 55 | 55 | 55 | 55 |
| Additive 2 | 1 | 1 | 1 | 1 | 1 |
| Crystallinity (%) | 68.7 | 47.9 | 21.3 | 73.4 | 18.6 |

Resin 1: Polypropylene resin
Resin 2: Polyolefin elastomer
Additive 1: Carbon Black
Additive 2: Antioxidant 2. Evaluation of Physical Properties 1) Evaluation of Room Temperature Elongation Elongation at break was measured at a tensile rate of 200 mm/min for the dumbbell specimen according to each of examples and comparative examples in accordance with ASTM D638.

2) Evaluation of Heat Resistance

In accordance with ASTM D638, the dumbbell specimen according to each of examples and comparative examples was placed in an oven at 136° C. for 240 hours and was then placed in an oven at 150° C. for 240 hours, and the residual elongation, which is the ratio of decreased elongation to elongation before heating, of the dumbbell specimen was measured.

3) Evaluation of Surface Properties

The number of protrusions by diameter per unit area (90 $cm^2$) was measured on the surface of the press specimen according to each of examples and comparative examples.

The results of measurements are shown in Table 2 below.

TABLE 2

| | | Example 1 | Example 2 | Example 3 | Comparative Example 1 | Comparative Example 2 |
|---|---|---|---|---|---|---|
| Room temperature elongation (%) | | 420 | 587 | 741 | 403 | 764 |
| Residual elongation | 136 °C × 240 h | 95.7 | 93.4 | 78.1 | 85.3 | 62.5 |
| after heating (%) | 150 °C × 240 h | 95.3 | 94.1 | 75.9 | 84.6 | 56.9 |
| Surface properties | 201 μm↑ | — | — | — | — | — |
| (ea) | 101~200 μm | — | — | — | 3 | — |
| | 51~100 μm | 2 | 1 | — | 20↑ | — |

As shown in Table 2 above, the semiconductive compositions of Examples 1 to 3 with crystallinity adjusted to 20 to 70% according to the present disclosure were found to have improved mechanical properties such as room temperature elongation, heat resistance such as residual elongation after heating, and extrudability such as surface properties. In contrast, the semiconductive composition of Comparative Example 1 with a crystallinity of more than 70% was found to have lower heat resistance despite having higher crystallinity than the semiconductive composition of Example 1, as well as significantly reduced extrudability, such as formation of a plurality of protrusions on the surface of the pressed specimen. In addition, the semiconductive composition of Comparative Example 2 with a crystallinity of less than 20% was found to have significantly reduced heat resistance.

Although preferred embodiments of the present disclosure have been described in this specification, those skilled in the art will appreciate that various changes and modifications are possible without departing from the idea and scope of the present disclosure recited in the appended claims. Therefore, it should be understood that such changes and modifications fall within the technical category of the present disclosure as long as the changes and modifications include elements described in the claims of the present disclosure.

The invention claimed is:

1. A semiconductive composition comprising:

a non-crosslinked polypropylene resin and a polyolefin elastomer as a base resin; and a conductive additive, wherein the content of the non-crosslinked polypropylene resin is 25 to 50 parts by weight of the base resin and the content of the polyolefin elastomer is 50 to 75 parts by weight based on 100 parts by weight of the base resin, wherein the content of the conductive additive is 30 to 60 parts by weight based on 100 parts by weight of the base resin, wherein crystallinity of the semiconductive composition defined by Equation 1 below is 20% to 47.9%, $$\text{Crystallinity (\%)} = \text{semiconducting integral value} / \text{insulating integral value} \times 100 \quad \text{[Equation 1]}$$

wherein the semiconducting integral value means a value of integral of an endothermic peak in a temperature section of 100 to 170 degrees Celsius of a first heating curve measured under conditions of a temperature range of 30 to 200 degrees Celsius and a temperature increase rate of 10 degrees Celsius per minute using a differential scanning calorimetry (DSC) for a specimen formed from the semiconductive composition, and the insulating integral value means a value of integral of an endothermic peak in a temperature section of 100 to 170 degrees Celsius of a first heating curve measured under conditions of a temperature range of 30 to 200 degrees Celsius and a temperature increase rate of 10 degrees Celsius per minute using the differential scanning calorimetry (DSC) for a specimen formed from an insulating composition comprising only the non-crosslinked polypropylene resin as a base resin.

2. The semiconductive composition according to claim 1, wherein the conductive additive comprises carbon black.

3. The semiconductive composition according to claim 1, further comprising 0.5 to 3 parts by weight of an antioxidant based on 100 parts by weight of the base resin.

4. A power cable comprising:

at least one conductor;

an inner semiconductive layer configured to enclose the conductor;

an insulating layer configured to enclose the inner semiconductive layer;

an outer semiconductive layer configured to enclose the insulating layer; and a sheath layer configured to enclose the outer semiconductive layer, wherein at least one of the inner semiconductive layer and the outer semiconductive layer is formed from a semiconductive composition comprising:

a polypropylene resin and a polyolefin elastomer as a base resin; and a conductive additive, wherein crystallinity of the semiconductive composition defined by Equation 1 below is 20% to 47.9, $$\text{Crystallinity (\%)} = \text{semiconducting integral value} / \text{insulating integral value} \times 100 \quad \text{[Equation 1]}$$

wherein the semiconducting integral value means a value of integral of an endothermic peak in a temperature section of 100 to 170 degrees Celsius of a first heating curve measured under conditions of a temperature range of 30 to 200 degrees Celsius and a temperature increase rate of 10 degrees Celsius per minute using a differential scanning calorimetry (DSC) for a specimen formed from the semiconductive composition, wherein the content of the polypropylene resin is 25 to 50 parts by weight of the base resin and the content of the polyolefin elastomer is 50 to 75 parts by weight based on 100 parts by weight of the base resin, wherein the content of the conductive additive is 30 to 60 parts by weight based on 100 parts by weight of the base resin, and the insulating integral value means a value of integral of an endothermic peak in a temperature section of 100 to 170 degrees Celsius of a first heating curve measured under conditions of a temperature range of 30 to 200 degrees Celsius and a temperature increase rate of 10 degrees Celsius per minute using the differential scanning calorimetry (DSC) for a specimen formed from an insulating composition comprising only a non-crosslinked polypropylene resin as a base resin.

5. The power cable according to claim 4, wherein the insulating layer is formed from an insulating composition comprising a non-crosslinked polypropylene resin as a base resin.

* * * * *